United States Patent
Aoyama et al.

(10) Patent No.: US 6,286,364 B1
(45) Date of Patent: Sep. 11, 2001

(54) METHOD AND APPARATUS FOR MEASURING AERODYNAMIC CHARACTERISTICS OF A GOLF BALL

(75) Inventors: Steven Aoyama, Marion; William Gobush, N. Dartmouth; Diane I. Pelletier, Fairhaven; Charles A. Days, S. Dartmouth; George Costa, Somerville, all of MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/397,497

(22) Filed: Sep. 17, 1999

Related U.S. Application Data

(63) Continuation-in-part of application No. 09/156,611, filed on Sep. 18, 1998.
(51) Int. Cl.[7] ............................ A63B 53/00; G01M 1/00
(52) U.S. Cl. ........................................... 73/65.03; 473/156
(58) Field of Search ......................... 73/65.03; 473/140, 473/152, 156, 198, 199

(56) References Cited

U.S. PATENT DOCUMENTS

| | | | |
|---|---|---|---|
| 4,033,318 | * 7/1977 | O'Grady | 124/7 |
| 4,570,607 | * 2/1986 | Stokes | 124/56 |
| 5,056,791 | * 10/1991 | Poillon et al. | 473/156 |
| 5,221,082 | * 6/1993 | Curshod | 473/199 |
| 5,437,457 | * 8/1995 | Curchod | 473/199 |
| 5,586,940 | * 12/1996 | Dosch et al. | 473/140 |
| 5,863,255 | * 1/1999 | Mack | 473/152 |
| 6,186,002 | 2/2001 | Lieberman et al. | 73/432.1 |

* cited by examiner

Primary Examiner—Max Noori
(74) Attorney, Agent, or Firm—Pennie & Edmonds

(57) ABSTRACT

A method and a system for measuring the spin decay rate of a golf ball. The system includes an indoor testing area, a launching device, and a measuring device positioned at a final position along the ball's flight path. When the ball is launched by the launching device, the measuring device measures the spin rate and speed at the final position. Then, the launching device can launch the ball at the speed and spin rate of the final position and a new final speed and spin rate are measured again. The spin rate difference from launching to the final position is used to determine the spin decay rate. By using discrete spin decay rate measurements, the spin decay rate profile of a golf ball during its entire flight can be measured in the indoor area.

22 Claims, 9 Drawing Sheets

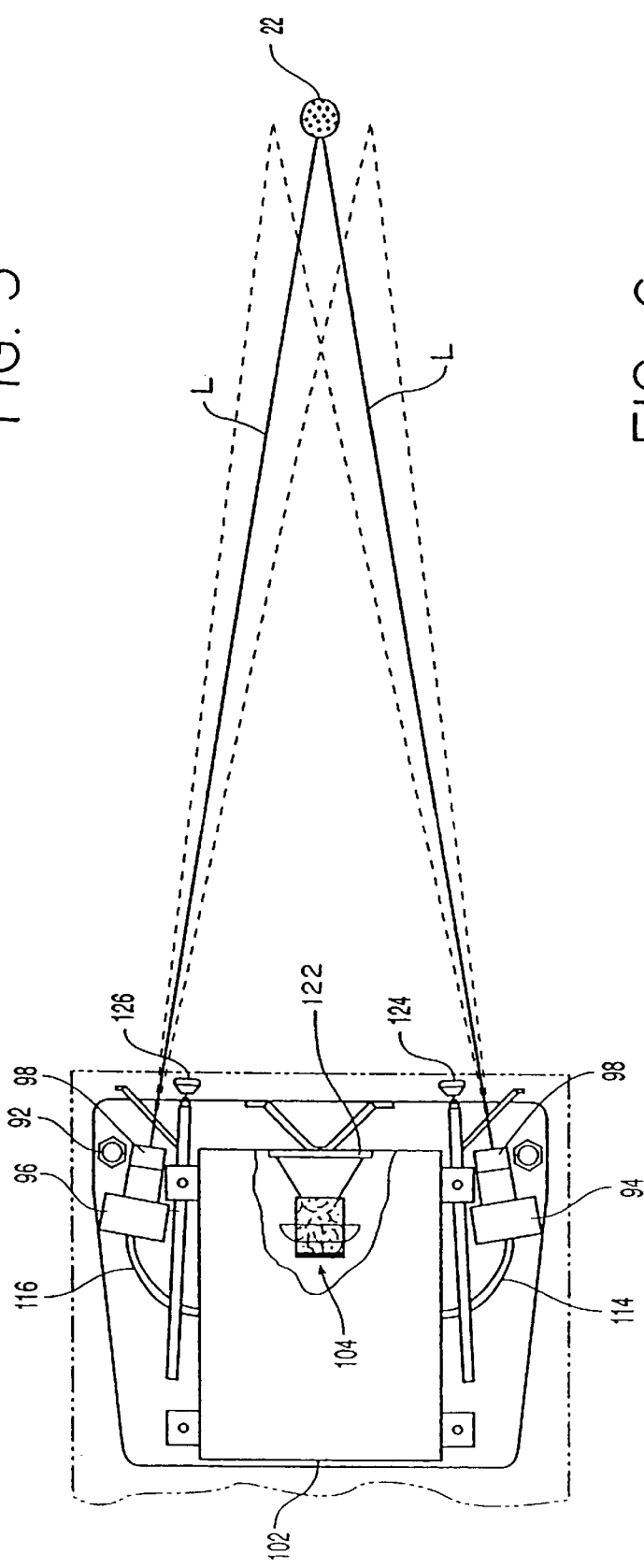
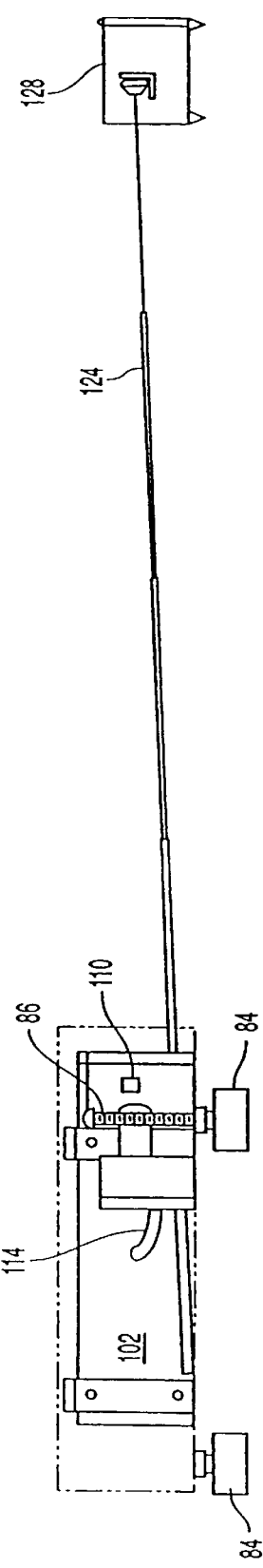
FIG. 5
FIG. 6

METHOD AND APPARATUS FOR MEASURING AERODYNAMIC CHARACTERISTICS OF A GOLF BALL

This application is a continuation-in-part of co-pending U.S. patent application Ser. No. 09/156,611 filed Sep. 18, 1998 pending.

TECHNICAL FIELD OF INVENTION

The present invention generally relates to a method and apparatus for measuring aerodynamic and mechanical properties of objects, and more particularly of measuring the spin decay rate of golf balls in flight.

BACKGROUND OF THE INVENTION

Golf ball manufacturers typically are interested in determining various aerodynamic and mechanical characteristics for golf balls. One such aerodynamic characteristic that is critical to golf ball performance is the ball's spin decay rate during its flight. The spin decay rate indicates the change in spin rate over time. The greater the spin decay rate, the quicker the spin rate decreases. Consequently, the ball's trajectory is flatter, and the ball travels farther. In order to improve existing golf balls and develop better, new golf balls, manufacturers have used two techniques for measuring golf ball spin decay rates over its entire flight. One conventional technique uses a wind tunnel and the other technique uses a large testing range.

The first technique utilizes a golf ball that is supported on a spindle within the wind tunnel. The spindle is affixed to the surface of the ball. The spindle freely rotates on low friction bearings. With the ball immersed in the wind stream, a motor coupled to the spindle spins the ball to a predetermined rate. The motor is disconnected from the spindle, and the ball continues to spin under the influence of its inertia and spin decay rate. The ball's spin rate is monitored over time by a non-contact tachometer. The spin decay rate is determined by analyzing the spin rate versus time data.

This method is problematic for several reasons. First, there is a turbulence level present in the airstream of any wind tunnel, which is not present in the atmosphere through which a golf ball normally flies. Since a golf ball's aerodynamics are fundamentally turbulence driven, this can significantly affect the outcome of the test.

Second, in the wind tunnel the wind stream around the ball is disturbed at the point where the spindle is joined to the ball. This affects the spin decay measurement in a way for which it is difficult to compensate.

Furthermore, when using the wind tunnel, the ball's spin decay rate is determined by its aerodynamic spin resistance (i.e., drag) and the aerodynamic and mechanical spin resistance of the spindle and the bearings. As a result, the data must be corrected to account for the spin resistance of the spindle and bearings. Thus, the analysis of the data is more complex and the results obtained are less accurate.

A second technique to determine spin decay involves monitoring the entire golf ball flight trajectory continuously. This requires a testing range large enough to contain the ball's entire flight, which is can be 300 yards long. In the second technique, the ball is marked so that some but not all of its surface reflects a predetermined type of electromagnetic radiation source, such as light. The ball is launched into flight, and the source of radiation is directed at the ball. Sensors or cameras are set-up at spaced locations along the ball's flight path. Each sensor detects the pulses of energy radiation that are reflected off of the ball when the ball passes by the sensor. When a camera is used, time exposure images of the ball are taken along the path. When the reflective surface is facing the light source and camera, the camera image is an associated bright area. When the reflective surface is facing away from the light source and camera, the camera image is an associated dark area. As a result, the image of the ball's flight path is a series of alternating bright and dark areas called "broken-streak" images of the ball. The spin decay rate can be calculated by analysis of the resulting broken-streak images of the ball.

This method is troublesome for several reasons. First, testing ranges of sufficient size are typically outdoor ranges, since indoor ranges of the proper size are rare. Outdoor ranges are susceptible to uncontrollable environmental conditions, such as wind and lighting, which adversely impact the results or test schedule.

Furthermore, the distances between the sensors and the ball in flight are large. This requires either a large reflective marker on the ball or a very powerful electromagnetic radiation source. The large reflective marker can alter the ball's aerodynamic characteristics, which negatively affects the test results. The powerful radiation source has the drawbacks of being expensive, cumbersome, and possibly dangerous. In addition, the analysis of the broken-streak images is time consuming and the results are less accurate than desired.

It would therefore be desirable to provide a method and an apparatus for determining the spin decay rate of a golf ball using an indoor testing range and a ball in actual flight.

SUMMARY OF THE INVENTION

Broadly, the present invention comprises method and apparatus for measuring the spin decay rate of a golf ball.

A method of determining a spin decay rate of a golf ball along a flight path, wherein the method comprises the steps of providing a launching device for launching the golf ball along the flight path at an initial speed and initial spin rate, repeatedly launching the golf ball along the flight path at a plurality of different initial speeds and spin rates, and measuring a final spin rate at a final position spaced from the launching device. The first initial speed and spin rate equal predetermined values and the subsequent initial speed and spin rate equal the previous final values. The step of measuring further includes taking two images of the ball at the final position. After measuring, the method includes timing the flight of the ball from the launching to the final position, determining the spin decay rate using the images at the final position, and combining the spin decay rates for each launching to form the spin decay rate profile for the ball along the flight path. By launching the golf ball at the final spin rate as determined by the method an indoor range can be used to determine the aerodynamic characteristics of a golf ball during its entire flight. In another embodiment, a single launch can be done and used to calculate the spin decay rate over one flight interval.

A system for measuring a spin decay rate for a golf ball along a flight path having a plurality of flight intervals, wherein the system comprises a launching device for launching the golf ball along the flight path at an initial speed and spin rate, a timer, and at least two measuring devices. The timer measures a time interval for the flight of the golf ball between a first position and a spaced second position. The first measuring device located at the first position determines a first spin rate of the golf ball at the first position and the second measuring device located at the second position determines a second spin rate of the golf ball at the second position. The first and second spin rates and the time interval are used to determine the spin decay rate for each flight interval.

In one embodiment, each measuring device includes a tower for supporting a monitor where the tower allows the monitor to be moved vertically.

BRIEF DESCRIPTION OF THE DRAWINGS

FIG. 5 is a top view of the monitor of FIG. 4;

FIG. 6 is a side elevational view of the monitor of FIG. 4 during calibration;

DETAILED DESCRIPTION OF THE PREFERRED EMBODIMENTS

Figure 1:
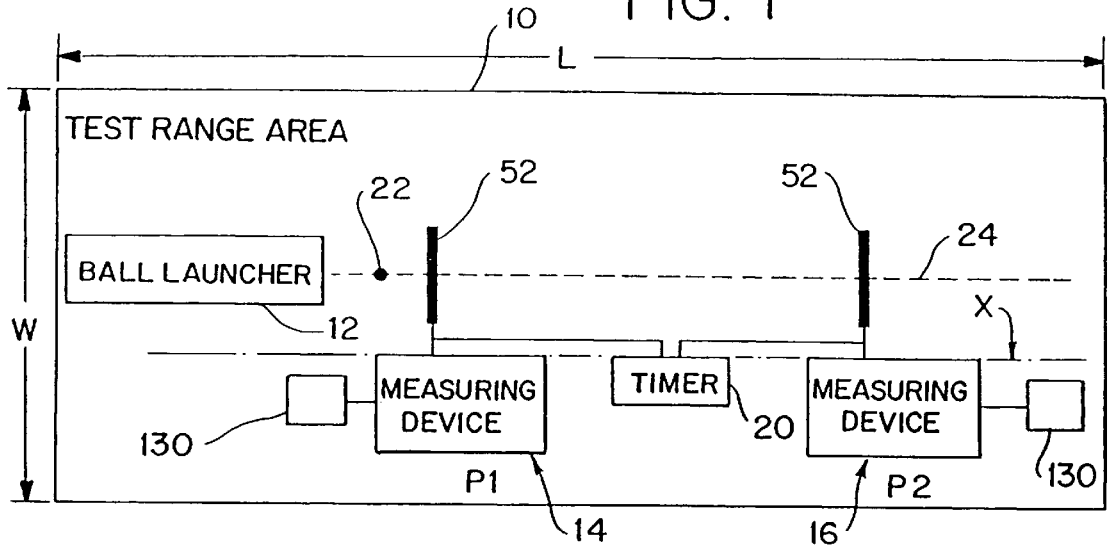
FIG. 1 is a schematic plan view representing a system for measuring aerodynamic properties of a ball.

FIG. 1 illustrates a schematic plan view of a system for testing of the present invention. The system includes an indoor testing area 10, which contains a ball launching device 12, two measuring devices 14 and 16 with monitors, and a timer 20.

Figure 3:
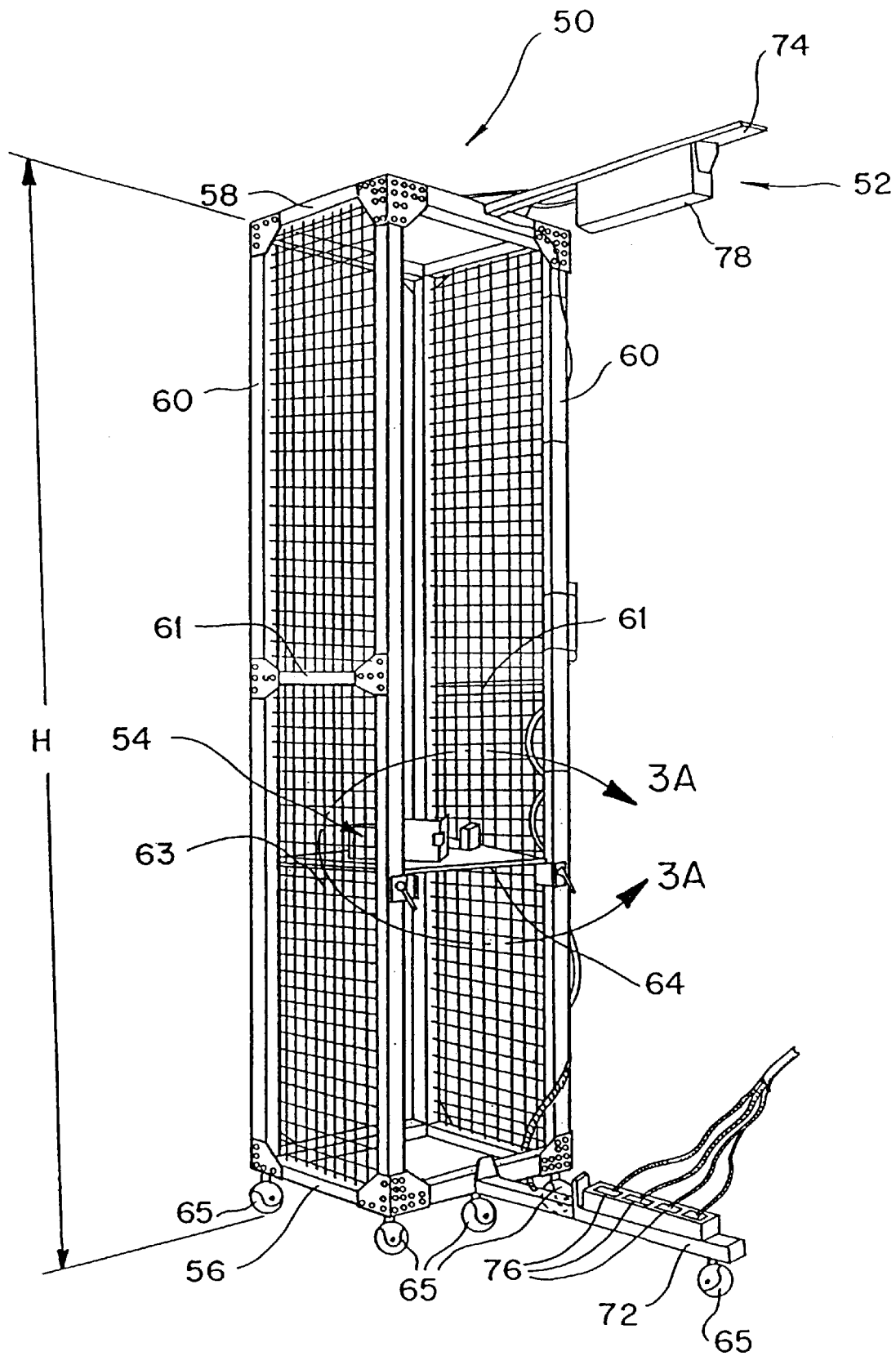
FIG. 3 is a perspective view of a measuring device for use in the system of FIG. 1.

The indoor testing area 10 is an indoor space that has a length L, a width W and a height H (as shown in FIG. 3). The length L is preferably less than about 100 feet and more preferably about 60 feet. The width W is preferably less than 20 feet and more preferably about 10 feet. The height H is preferably less than 20 feet and more preferably about 10 feet. This size of the testing area is exemplary and can be modified by one of ordinary skill in the art. This allows the system to be used in numerous existing commercial buildings. The testing area should be enclosed within conventional protective netting for safety reasons.

The ball launching device 12 is set-up at one end of the testing area 10. The launching device 12 is capable of independently controlling the initial velocity, spin rate, and direction of a golf ball 22 that it launches along a ball flight path 24 (shown in phantom). The preferred launching device is commercially available under the name the Ultra Ball Launcher, which is manufactured by Wilson® Sporting Goods Co. Other conventional launching devices can be used, such as a True Temper Driving Machine, which strikes balls with a golf club.

Figure 2:
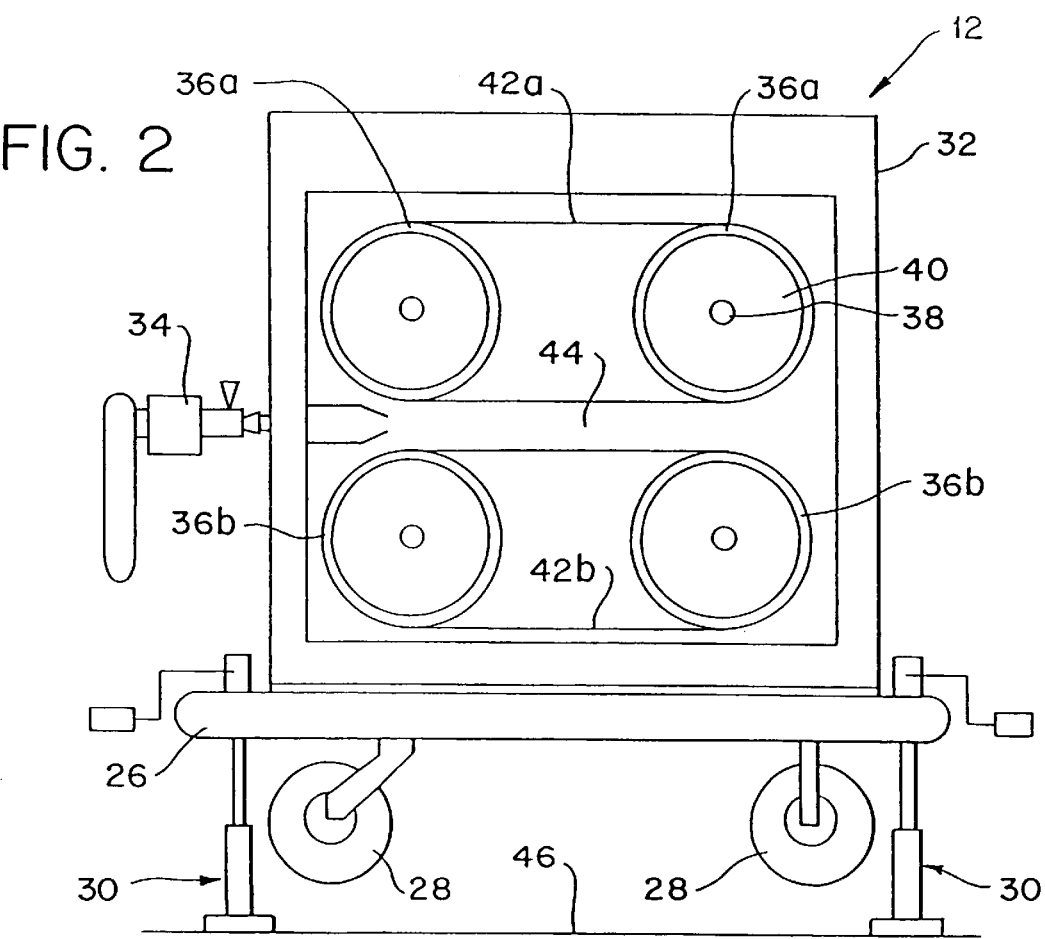
FIG. 2 is a side view of a golf ball launching device for use in the system of FIG. 1.

Referring to FIG. 2, the preferred launching device 12 includes a base 26 supported by pneumatic tires 28, when the device is mobile. When the device is stationary, it is supported by leveling jacks 30. The leveling jacks 30 are telescoping members, which are manually adjustable to change the height of the base. The base 26 supports a vertically extending frame 32.

The frame 32 has an air cannon 34 mounted on one end for firing the ball at various speeds. The frame 32 further includes two pulley assemblies 36a and 36b. The first pulley assembly 36a is mounted at a first height, and the second pulley assembly 36b is mounted at a second height below the first wheel assembly.

Each pulley assembly includes a pair of shafts 38 with disks 40 rigidly attached so that the disk 40 rotates relative to the frame 32. One motor (not shown) rotates one shaft in each assembly.

The device 12 further includes two belts 42a and 42b. One belt surrounds each pair of disks 40. The belts 42a and 42b define a ball launch path 44 there between and adjacent the air cannon 34.

During operation, after the air cannon 34 shoots the ball into the launch path 44, the belts 42a and 42b move at various belt speeds to impart the proper spin rate and velocity to the ball. The average speed of the two belts determine the ball's speed. The difference in speed between the belts controls the ball's spin rate. The ball launch angle is determined by the angle between the ball launch path 44 and the ground 46. The launch angle is adjusted by changing the height of the front end of the vertical frame 32 relative to the base 26. The leveling jacks 30 can also be used to change the launch angle.

Referring to FIG. 1, the two measuring devices 14 and 16 determine the spin rate of the ball 22, and are located along side of the ball's flight path 24. The first measuring device 14 is located at a first position P1 downstream of the launching device 12, and the second measuring device 16 is located at a second position P2 spaced downstream of the first position P1.

Referring to FIGS. 1 and 3, each measuring device 14 and 16 includes a movable tower 50 that holds a ballistic light screen assembly 52 and monitor 54. The tower 50 is a box-like structure and includes a lower rectangular frame 56, an upper rectangular frame 58, and vertical columns 60 that join the frames 56 and 58 together at the corners. The tower also includes braces 61 for additional structural rigidity and wire mesh 63 at least on one side to protect the monitor 54 from flying balls. The frames 56 and 58, columns 60, and braces 61 are fastened together.

Figure 3A:
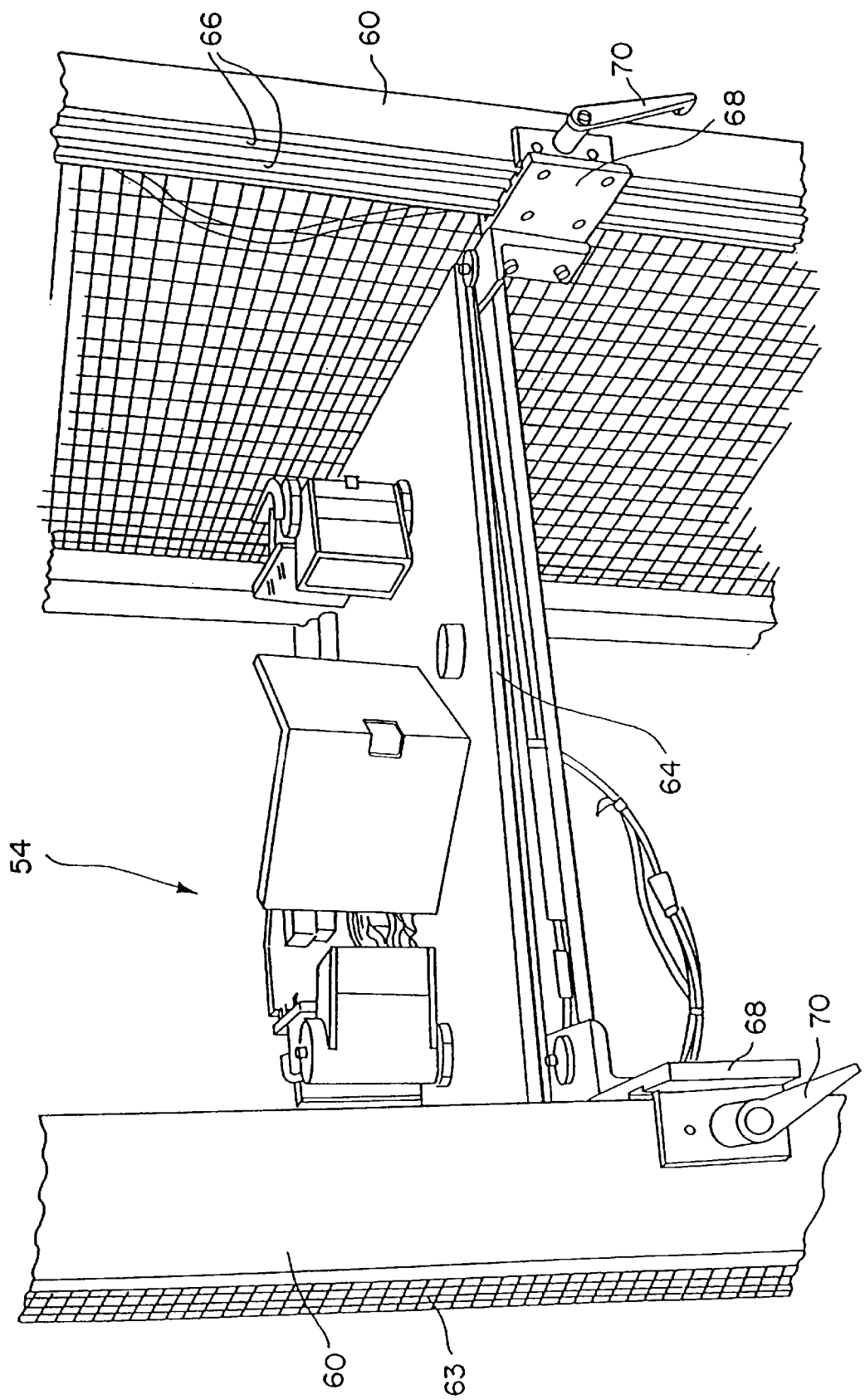
FIG. 3A is an enlarged view of a monitor shown within the circle 3A—3A of FIG. 3.

Referring to FIGS. 3 and 3A, the vertical columns 60 of the frame support a movable platform 64. Each column 60 defines grooves 66. A slider 68 is slideably attached to each column 60 through the grooves 66. The platform 64 is fastened to each of the sliders 68, and thus the platform 64 is vertically movable along the length of the columns 60. The platform is secured at various positions along the columns using clamps 70 connected to the sliders 68. Although, the movement of the platform 64 is manual in this embodiment, various conventional components can be used to automate the movement of the platform 64 along the columns, as known by those of ordinary skill in the art. The platform 64 supports the monitor 54 and allows its vertical position to vary and match the vertical height of the ball's flight path 24.

Referring to FIG. 3, the tower 50 further includes two support arms 72 and 74 for holding, the components of the light screen assembly 52. The first support arm 72 extends horizontally outward from the lower frame 56 and is fastened thereto. The second support arm 74 extends horizontally outward from the upper frame 58 and is fastened thereto. Wheels 65 are connected to the lower frame 56 and the first support arm 72 so that the tower 50 is easily movable.

The light screen assembly 52 includes a plurality of connected sensors 76 and an elongated light bulb 78. The sensors 76 are mounted on the upper surface of the lower support arm 72 at spaced locations in a housing. The light bulb 78 is mounted on the lower surface of the upper support arm 74 so that light beams from the bulb 78 are directed downwardly in a screen toward the sensors 76. The light screen assembly is commercially available and one recommended light screen assembly is manufactured by Oehler Research under the name Model #55.

The light screen assembly 52 initiates and terminates various system functions, as discussed below. One such function is to act as a timer actuator for starting and stopping the timer 20 (as shown in FIG. 1). The present invention is not limited to this type of actuation device. Other devices such as an audio trigger, a microphone, ail acoustic screen, proximity sensors, or a series of laser beams can also be used.

Figure 4:
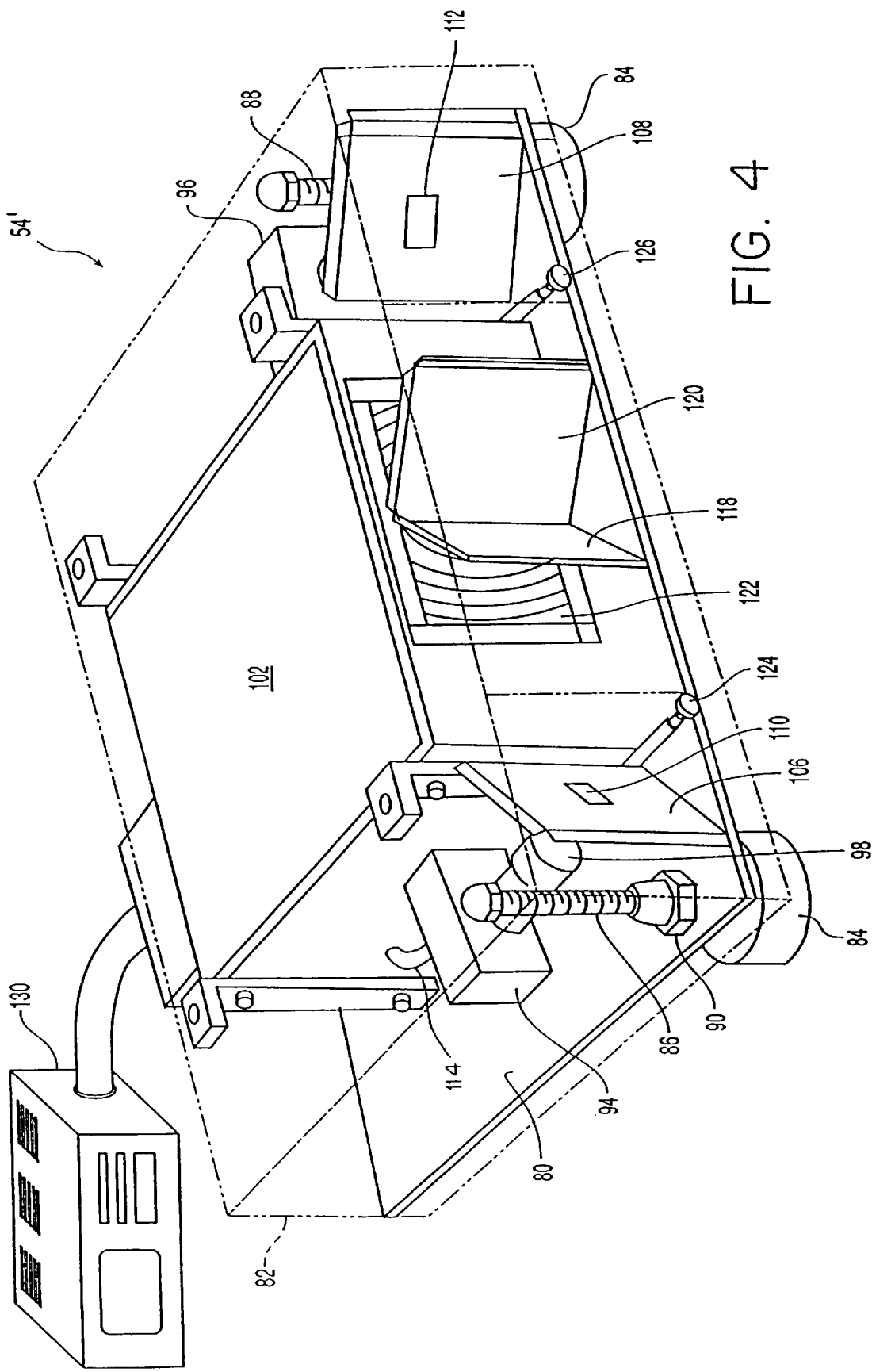
FIG. 4 is a perspective view of another embodiment of a monitor for use with the measuring device of FIG. 3.

Various monitors can be used as described in U.S. Pat. Nos. 5,471,383; 5,501,463; and 5,575,719 issued to Gobush et al. and expressly incorporated by reference herein in their entirety. Referring to FIG. 4, one embodiment of a monitor 54' is illustrated. The calibration, operation, detail of the components of the monitor, and techniques for determining spin rate are the subject of another commonly assigned application, U.S. patent application Ser. No. 09/156,611, which is expressly incorporated herein in its entirety by reference thereto.

Referring to FIGS. 4 and 5, the monitor 54' includes a base or support structure 80 that may also have a cover 82 (shown in phantom). Support elements or pads 84 are disposed below each corner of the support stricture 80. The monitor 54' also includes threaded rods 86, 88 and respective nuts 90, 92 for allowing, height adjustment at the front of monitor 54'. The rear of the base can also include rods and nuts so that the rear is also height adjustable.

Figure 7:
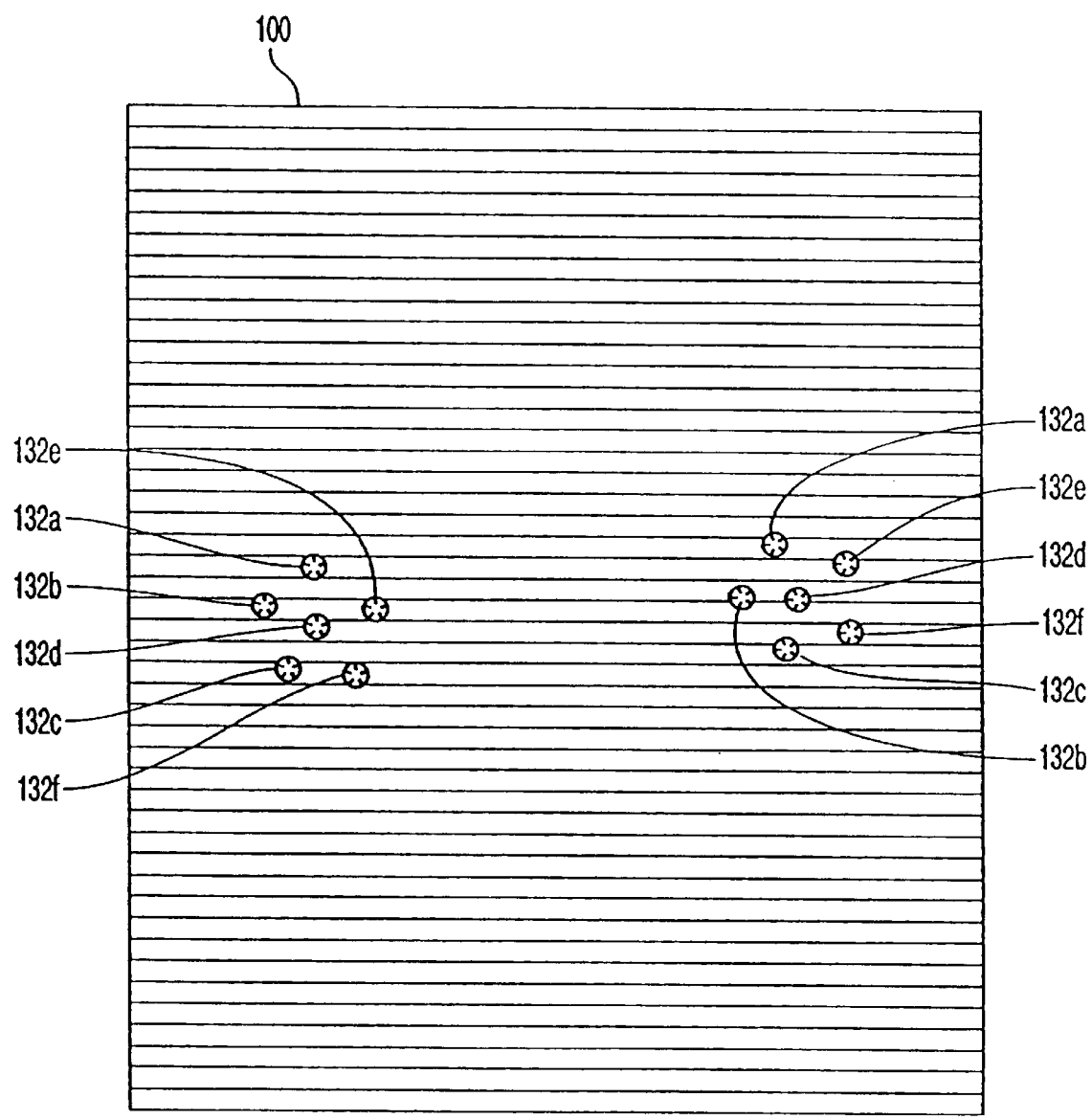
FIG. 7 is an elevational view of a light receiving and sensory grid panel located within the monitor of FIG. 4.

First and second camera units 94, 96 are affixed to support structure 80. These electro-optical units 94, 96 are preferably the ELECTRIM EDC-1000HR Computer Cameras available from the Electrim Corporation in Princeton, N.J. The cameras can be digital or film. In another embodiment, a single camera can be used; however, the results obtained will be less accurate than with two cameras. Each of the cameras 94, 96 has a lens 98, a light-receiving aperture, shutter, and light sensitive silicon panel 100 (see FIG. 7, showing a silicon panel, which also generally corresponds to an image captured by the cameras and used by the system).

The cameras 94, 96 each have a line-of-sight L, which are illustrated as solid lines in FIG. 5, that are directed to and focused on the predetermined field-of-view on the ball's flight path 24. As illustrated in FIG. 5 with the broken lines, the cameras' fields-of-view is larger than are necessary to image just a single golf ball 22. Thus, the predetermined field-of-view is the cameras' fields-of-view at the location where the cameras' lines-of-sight L intersect.

A control box 102 is provided and includes a strobe light unit at a front portion thereof. The strobe light unit has a single flash bulb assembly 104 capable of flashing faster than every 1000 microseconds. The unit also includes a cylindrical flash tube. The circuits used with the strobe light unit are the subject of another commonly assigned application (U.S. patent application Ser. No. 09/008,588), which is incorporated herein in its entirety by express reference thereto.

As best shown in FIG. 4, the reflective elements or panels 106, 108 are mounted to support structure 80. Panels 106, 108 may be plates formed of polished metal, such as stainless steel or chrome-plated metal. Other light reflective elements may also be used without departing from the spirit or scope of the invention. Each reflective panel 106, 108 defines respective apertures 110, 112.

Referring to FIGS. 4 and 5, cameras 94, 96 are mounted such that the lenses 98 are directed through the respective apertures 110, 112 in the reflective panels 106, 108 to the predetermined field-of-view. Video lines 114, 116 from the respective cameras 94, 96 lead to control box 102 to feed the video signals into control box 102 for subsequent use.

Referring to FIGS. 4 and 5, a third light-reflecting panel 118 reflects about one-half of the light from flash bulb assembly 104 into panel 106 while a fourth light-reflecting panel 120 reflects the other half of the light into light-reflecting panel 108.

To increase the amount of light directed to the reflective elements or panels 106, 108, 118, and 120, the system 54' preferably has an optical or Fresnel lens 122 inserted at the front of the control box 102, placed between the flash bulb assembly 104 and the third and fourth reflective elements or panels 118, 120 as shown in FIGS. 4 and 5.

A lens assembly is formed by the flash bulb assembly 04 and the Fresnel lens 122. The Fresnel lens 122 directs light from the flash bulb assembly 104 to the third and fourth reflective elements 118, 120. The Fresnel lens has a collimating effect on the light from a cylindrical flash tube. Thus, the Fresnel lens 122 controls the dispersion of light. This arrangement allows the monitor 54' to have a smaller flash bulb assembly 104 than without the lens 122 because the collimation of the light increases the flux of light directed toward the golf ball in the predetermined field-of-view. This increase in the flux allows the possibility of using other reflective materials to mark the ball (or none at all), as well as the use of the system in brighter lighting conditions, including full-sun daylight.

The locations of the strobe light, reflective elements and cameras allow the light directed from the strobe to enter the field-of-view and reflect back from the ball to the camera lenses through the apertures, due to reflective dots on the ball.

Referring to FIGS. 4–6, telescoping distance calibrators or members 124, 126 are affixed to support structure 80. The telescoping members 124, 126 are used in calibrating the monitor 54' along the ball flight path 24 (as shown in FIG. 1) at the appropriate distance from the object to be monitored. Distance calibrators 124, 126 are extendable members, for example, conventional radio antennae can be used. Calibrators 124, 126 are used in conjunction with a calibration fixture 128. At least one distance calibrator should be used.

The system 54' also has a computer and monitor 130. The computer and monitor may be combined into a single element or may be separate elements. The computer has several algorithms and programs used by the system to make the determinations discussed below. As shown in FIG. 1, each computer 130 is connected to its associated measuring device 14 and 16 so that signals from the light screen assemblies 52 and monitors are communicated to the computer.

Referring to FIG. 1, the timer or timing device 20 measures a time interval. In this embodiment, the timer 20 is a personal computer equipped with a commercially available timer board. One recommended timer board is manufactured by Metrabyte under the name CTM5. The timer 20 is linked to the light screen assemblies 52. The invention is not limited to this type of timing device, for example other recommended devices are clocks and trigger devices, which are well known to those of skill in the art. In another embodiment, the timer can be incorporated into one of the computers connected to the monitor, so that a separate computer with a timer is not necessary.

Figure 8:
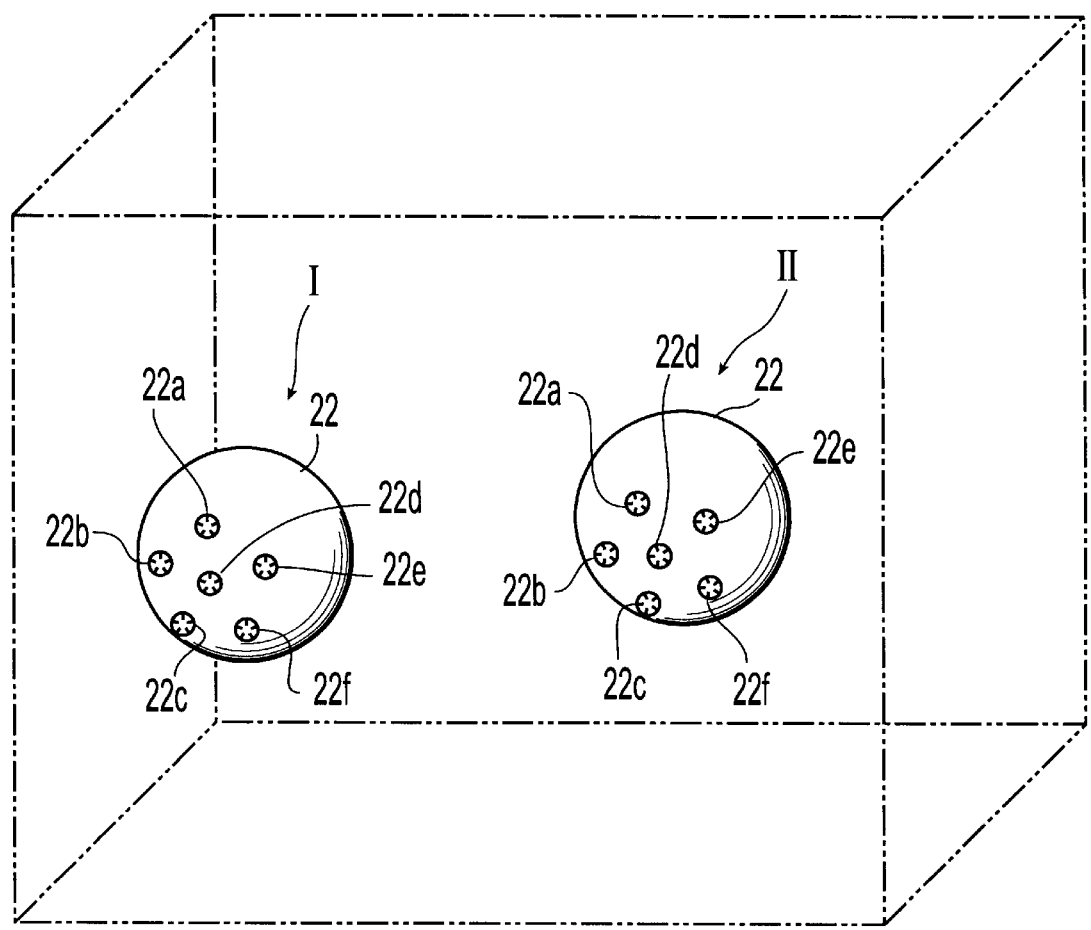
FIG. 8 is a perspective view of a three-dimensional rectilinear field-of-view showing the golf ball at two different angular orientations.
Figure 9:
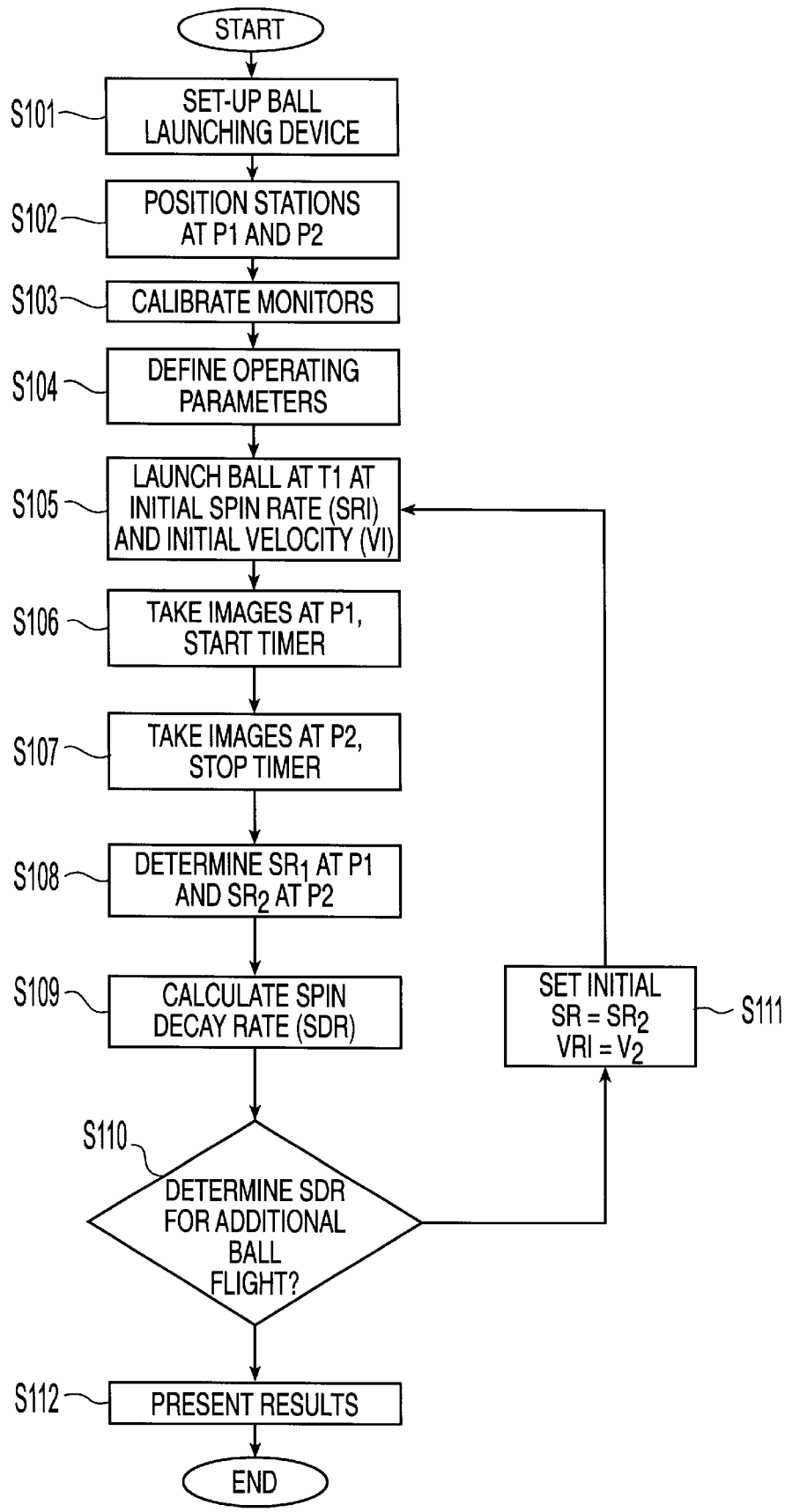
FIG. 9 is a flow chart describing the method of determining the spin decay rate according to the present invention.

In FIG. 8, a three-dimensional, predetermined, rectilinear field-of-view is shown in phantom. The golf ball 22 preferably has six (6) reflective, spaced-apart round areas or dots 22a–f placed thereon. Golf ball 22 is shown in two different angular orientations I and II to illustrate the preferred embodiment, corresponding to the locations of the golf ball 22 when imaged by each measuring device 14 and 16 (as shown in FIG. 1). In positions I and II, the golf ball 22 is shown after being launched from the ball launcher 12. The image taken at position I occurs at a first time and the image at in position II occurs at a second time. Both images are taken by measuring device 14 at the first position P1 or measuring device 16 at the second position P2 to determine the spin and velocity at positions P1 and P2. The velocity at P2 equals second velocity V2. The number of dots or areas may be as few as three (3) and up to six (6) or more for the golf ball, provided each dot or area reflects light from the golf ball in both positions shown in FIG. 8.

Referring to FIGS. 4 and 8, as a result of the positioning of the cameras 94, 96 and the dots 22a–f, both cameras 94 and 96 are capable of receiving light reflected by dots 22a–f, which appear as bright areas 132a–f on the silicon panel 100 (as shown in FIG. 7) and the corresponding image. Alternatively, the dots may be non-reflective, appearing as dark areas 132a–f on the silicon panel. Instead of dots, the manufacturer's graphics, painted spots, corner-reflective retro-reflectors, or specially applied ink markings can be used.

Referring to FIGS. 1–3, and 9, the test procedure includes at step S101 setting up the ball launching device 12 at one end of the indoor testing area 10 and setting the initial velocity, spin rate, launch angle, and ball flight path 24 for the ball 22.

At step S102, the measuring devices 14 and 16 are set-up at their respective positions P1 and P2, so that the cameras 94 and 96 (as shown in FIG. 4) are a predetermined distance from the ball flight path 24. This distance should allow the cameras to view and focus on the ball 22. A recommended distance is about 30 inches.

The devices 14 and 16 should be aligned along a camera axis X that is parallel to the ball flight path 24. Various techniques can be used to align the cameras, for example a laser beam mounted on the first device 14 can be aimed parallel to the ball's flight path 24 at the proper distance. The second device 16 is then aligned with the beam. Next, the monitors are started and the computer determines if this is the first time the associated monitor has been used. By default, the monitor will use the last calibration when it is first activated. Therefore, at step S103, the monitors are calibrated each time the monitor is moved and/or turned on. Each monitor is calibrated to define the coordinate system to be used by the monitor using the telescoping members 124 and the fixture 128 (as shown in FIG. 6). Calibration of the monitors are detailed in U.S. patent application Ser. No. 09/156,611.

After each monitor is calibrated, the system is set in a test or a demonstration mode. If the test mode is selected, the system will save the test data, while in the demonstration mode it will not save the data.

At step S104, operating parameters or data specific to the location of the test is entered as well. Specifically, the operator enters data for ambient conditions such as temperature, humidity, and atmospheric pressure.

After this data is entered, the monitor is ready for use. At step S105, the launching device 12 launches the ball 22 into flight at an initial velocity VI and initial spin rate SRI at an initial time TI.

At step S106, when the ball enters the first light screen 52 at position P1, the sensors 76 register a decrease in the light level from the bulb 78 and send a signal to the timer 20 to start. Simultaneously, a signal is sent to the computer 130 of the first monitor 54 at position P1 to take first images of the golf ball 22 at two times (as shown in FIG. 8) in the predetermined field-of-view. The time between taking the images is preferably 800 microseconds. The images recorded by the silicon panel 100 (as shown in FIG. 7) are used by the monitor to determine the flight characteristics of the golf ball.

At step S107, after a short time interval, when the ball passes through the light screen assembly 52 at the second position P2, the sensors 76 send a signal to the timer 20 to stop. Simultaneously, a signal is sent to the computer 130 of the second monitor 54 at position P2 to take two images of the ball at two times (as shown in FIG. 8) in the predetermined field-of-view. The time between taking the images is preferably 800 microseconds. The images recorded by the silicon panel 100 (as shown in FIG. 7) are used by the monitor to determine the flight characteristics of the golf ball. These images are sent to the associated computer 130.

At step S108, each monitor uses several algorithms stored in the computer to determine the location of the golf ball relative to the monitor. After the computer has determined the location of the golf ball from the images, the monitors (and computer algorithms) determine the spin rate SR1 and SR2 of the ball at each position P1 and P2, respectively. These determinations include locating the bright areas in the images, determining which of those bright areas correspond to the dots on the golf ball, and, then using this information to determine the location of the golf ball from the images, and calculate the difference in angular orientation between the images.

Specifically, the monitor analyzes the images recorded by the cameras by locating the bright areas in the images. A bright area in the image corresponds to light from the flash bulb assembly 104 reflecting off of the retro-reflective dots or markers on the golf ball. Since the golf ball preferably has 6 dots on it, the system should find twelve bright areas that represent the dots in the images from each of the cameras (2 images of the golf ball with 6 dots). The system then determines which of those bright areas correspond to the golf ball's reflective dots. This can be done in several ways. If only twelve dots are found in the image, the system moves on to determine, from the dots in the images, the position and orientation of the golf ball during the first and second images. However, if there are more or less than twelve dots or bright areas found in the images, then the system allows the operator to manually change the images. If too few bright areas are located, the operator adjusts the image brightness, and if too many are present, the operator may delete any extraneous bright areas. In some instances, the bright areas in the images may be reflections off of other parts of the golf ball. If it is not possible to adequately adjust the brightness or eliminate those extraneous bright areas, then the system returns the operator to step S105 to have the launching device launch another golf ball. If the manual editing of the areas is successful, however, then the system goes on.

The system uses the identification of the dots to determine the location of the centers of each of the twelve dots in each of the two images. Knowing the location of the center of each of the dots, the system can calculate the golf ball's spin rate, velocity, and direction.

At step S109, the spin decay rate SDR is calculated using a curve fit or a mathematical model, as known by those of ordinary skill in the art. If desired, the similar techniques can be used to determine the velocities at positions P1 and P2, and the velocity decay rate for the intervals.

If it is required to determine the spin decay rate for other intervals of the ball's flight, then at step S110 the yes branch is followed. At step S111, the initial velocity VI used by the launcher is changed to V2. In addition, the initial spin rate SRI used by the launcher is changed to the spin rate SR2 at the second position P2. The spin decay rate ($\omega$) is calculated according to the following formula:

$$\dot{\omega} = \frac{|\omega_f - \omega_i|}{\Delta t},$$

,where $\omega_f$=spin rate at the second position (SR2);
$\omega_i$=spin rate at the first position (SR1); and
$\Delta t$=time difference between the first time at P1 and the second time at P2.

Steps S105–109 are repeated so that the ball is again launched and the velocity and spin rates at the positions P1 and P2 are measured and the spin decay rate is calculated for this additional flight interval. Subsequent measurements are similarly taken over each desired flight interval. By using these discrete spin decay rate measurements over the intervals, the spin decay rate profile of the ball's entire flight is determined. Thus, the indoor range achieves the results of the outdoor range with the advantage of requiring less space and eliminating the uncontrollable environmental conditions that can occur at an outdoor testing area. The operator can stop measuring, when a predetermined path distance or flight time has been simulated that correlates to a total "flight."

If it is not required to determine the spin decay rate for other intervals of the ball's flight, then at step S110 the no branch is followed. Thus, step S111 is optional.

At Step 112, the spin decay rate is then presented to the operator in numerical and/or graphical formats.

In another embodiment, P1 is chosen to be near the launching device, and the spin and velocity at P1 are assumed to be the same as the settings of the launching device. Thus, only the monitor at P2 is needed. Otherwise, the procedure is the same as for the previous embodiment.

Figure 10:
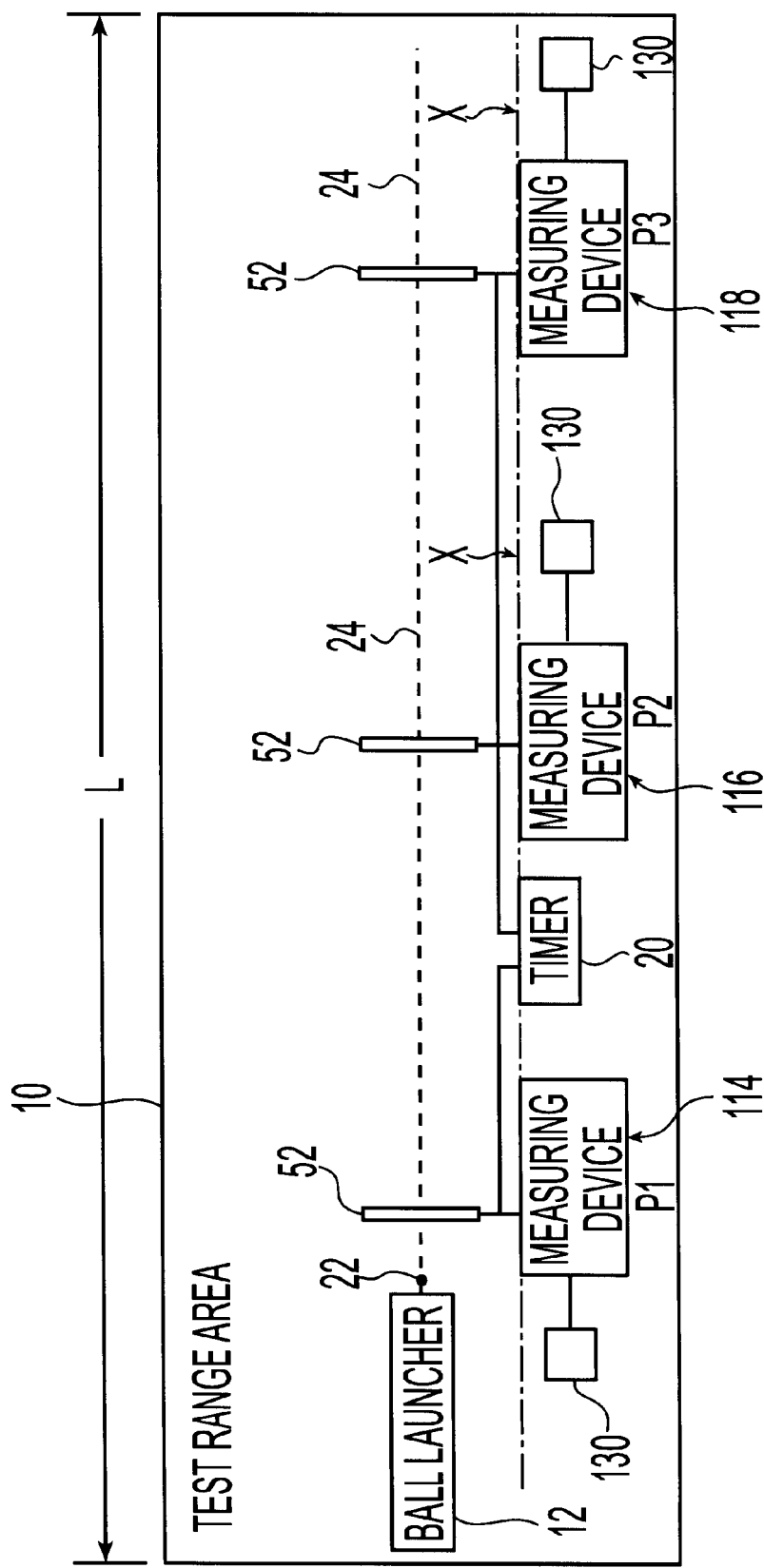
FIG. 10 is a schematic plan view representing another embodiment of a system for measuring aerodynamic properties of the ball.

As shown in FIG. 10, three measuring devices 114, 116 and 118 can also be used. Each measuring device is located at position P1, P2 or P3, respectively, and have the same configuration as discussed above. The spin measurements are taken at three positions and the information is used to determine spin decay as discussed above.

Tables I and II provide test data obtained according to the present invention. The results obtained below with golf balls are representative of the spin decay rate information that can be determined. In particular, the spin decay rates in percentages of change of spin rate were measured for various golf ball constructions. The initial conditions of one measurement are an initial velocity VI of 200 ft/sec and an initial spin rate SRI of 4000 rpm. For the other measurement, the initial velocity VI is 150 ft/sec and the initial spin rate is 6000 rpm.

TABLE I

Spin Decay Test Results

| Examples | Spin Decay Rate VI = 200 ft/sec SRI = 4000 rpm | Spin Decay Rate VI = 150 ft/sec SRI = 6000 rpm |
| --- | --- | --- |
| Wound/Large Liquid Center Ball | 1.1% | 2.9% |
| Wound/Small Liquid Center Ball | 0.7% | 2.7% |

In Table I, two wound construction liquid center golf balls are compared. Both golf balls have cores formed by winding elastomeric thread about a fluid-filled center. The fluid and fluid volume in the first example are different than those in the second example. The differences are intended to provide different spin decay rates. As shown by the data in Table I, the golf ball with the larger liquid center has a greater spin decay rate than the ball with the smaller liquid center.

TABLE II

Spin Decay Test Results

| Sample | Spin Decay Rate VI = 200 ft/sec SRI = 4000 rpm | Spin Decay Rate VI = 150 ft/sec SRI= 6000 rpm |
| --- | --- | --- |
| Solid Ball | 1.8% | 1.4% |
| Wound/Liquid Center Ball | 4.3% | 3.5% |

In Table II, a solid ball is compared to a wound ball with a fluid-filled center. It is expected that the solid ball with the solid center will exhibit a lower spin decay rate than the fluid-center, wound ball. As shown by the data in Table II, the solid ball has a lower spin decay rate than the fluid-center, wound ball as expected. Since different set-ups were used for the tests of TABLE I and II, the results from TABLE I cannot be compared with the results of TABLE II.

While the above invention has been described with reference to certain preferred embodiments, it should be kept in mind that the scope of the present invention is not limited to these embodiments. Rather than strobe lights, a continuous light source can be used with a very fast camera shutter. Some high speed electronic cameras require no special lighting. Conventional film cameras can also be used. Rather than one double exposure frame, sequential individual frames can be used. The pictures can be analyzed manually instead of automatically by the computer. The measuring device for measuring the spin rate should not limit the scope of the invention. Furthermore, more than three measuring devices can be used to do the measurements depending on the size of the test area and equipment available. One skilled in the art may find variations of these preferred embodiments which, nevertheless, fall within the spirit of the present invention, whose scope is defined by the claims set forth below.

We claim:

1. A method of determining a spin decay rate of a golf ball along a flight path, wherein the method comprises the steps of:
   a. providing a launching device for launching the golf ball along the flight path at an initial speed and initial spin rate;
   b. launching the golf ball along the flight path at the initial speed and the initial spin rate;
   c. measuring a final spin rate at a final position spaced from the launching device, wherein the step of measuring further includes taking two images of the ball at the final position;
   d. timing the flight of the ball from the launching to the final position; and
   e. determining the spin decay rate using the images at the final position.

2. A method of determining a spin decay rate of a golf ball along a flight path, wherein the method comprises the steps of:
   a. providing a launching device for launching the golf ball along the flight path;
   b. repeatedly launching the golf ball along the flight path at a plurality of different initial speeds and spin rates;
   c. after each launching measuring a final spin rate at a final position spaced from the launching device, wherein the step of measuring further includes taking two images of the ball at the final position, where the first initial spin rate equals a predetermined value and each subsequent initial spin rate equals the previous final spin rate;
   d. timing the flight of the ball from the launching to the final position;
   e. determining the spin decay rate using the images at the final position; and
   f. combining the spin decay rates for each launching to form the spin decay rate profile for the ball along the flight path.

3. The method of claim 2, wherein the step of measuring further includes measuring at least one intermediate spin rate at an associated intermediate position spaced between the launching device and the final position; and the step of timing further including timing the flight of the ball from the first intermediate position to the final position for each launching; and the step of determining the spin decay rate for each launching further including using the images at the intermediate and final positions for each launching.

4. The method of claim 3, further including measuring at least two intermediate spin rates at at least two intermediate positions spaced from the launching device and one another; after each launching, measuring a final spin rate at a final position spaced further from the launching device than the intermediate positions, where the first initial spin rate equals a predetermined value and each subsequent initial spin rate equals the previous final spin rate; timing the flight of the ball from the first intermediate position to second intermediate position; timing the flight of the ball from the second intermediate position to the final position for each launching; determining the spin decay rate for each launching using the intermediate spin rates and the final spin rate for each launching; and combining the spin decay rates for each launching to form the spin decay rate profile for the ball along the flight path.

5. The method of claim 3, wherein the step of measuring the intermediate and final spin rates further includes taking two images of the ball at the intermediate and final positions.

6. The method of claim 1, wherein the step of determining the spin decay rate further includes automatically calculating the spin decay rate from the images.

7. A system for measuring a spin decay rate for a golf ball along a flight path having a plurality of flight intervals, wherein the system comprises:
   a launching device for launching the golf ball along the flight path at an initial spin rate;
   a timer for measuring a time interval for the flight of the golf ball between a first position and a spaced second position; and
   a first measuring device located at the first position for determining a first spin rate of the golf ball at the first position; and
   a computer for using the first spin rate to determine the spin decay rate for at least one flight interval.

8. The system of claim 7, further including a second measuring device located at the second position for determining a second spin rate of the golf ball at the second position; wherein the first and second spin rates and the time interval are used to determine the spin decay rate for at least one flight interval.

9. The system of claim 8, wherein the first and second spin rates and the time interval are used to determine the spin decay rate for all of the flight intervals.

10. The system of claim 8, further including a timer actuator coupled to the timer, so that when the golf ball is in flight the timer starts when the golf ball reaches the first position and stops when the golf ball reaches the second position.

11. The system of claim 10, further including a third measuring device located at a third position for determining a third spin rate of the golf ball at the third position, so that the spin decay rate is determined between the first and second positions and between the second and third positions.

12. The system of claim 8, wherein the first and second positions form a line parallel to the flight path.

13. The system of claim 8, wherein the launching device includes two belts for launching the golf ball.

14. The system of claim 10, wherein each measuring device further includes a movable tower and a monitor supported by the tower.

15. The system of claim 14, wherein each tower further includes a frame and a platform movable vertically on the frame, said platform supports the associated monitor and allows the platform to be vertically adjustable.

16. The system of claim 14, wherein the timer actuator further includes two pairs of light beams and sensors, the first pair of light beams and sensors being coupled to the tower at the first position and the second pair of light beams and sensors being coupled to the tower at the second position; wherein the first sensors send a signal to the timer to start and the second sensors send a signal to the timer to stop.

17. The system of claim 14, wherein each monitor further includes:

a support structure;

a first light-reflecting element disposed on the support structure;

a lighting unit disposed on the support structure and directing light into a predetermined field-of-view along the flight path of the ball;

a first camera unit disposed on the support structure and pointed toward the predetermined field-of-view to create at least two images of the golf ball while moving in the predetermined field-of-view; and computer to control the system and determine the flight characteristics of the golf ball from said images.

18. The system of claim 17, wherein the computer includes means for determining the first spin rate of the golf ball from the images at the first position and the second spin rate of the golf ball from the images at the second position.

19. The system of claim 18, wherein the computer includes means for determining the spin decay rate from the first spin rate and the second spin rate.

20. The system of claim 19, wherein the computer further includes the timer.

21. The system of claim 1, wherein the initial speed and the initial spin rate are known at launching the golf ball, wherein the step of determining the spin decay rate further includes using the initial speed and the initial spin rate.

22. The system of claim 14, wherein the first measuring device is a monitor for taking at least two images of the golf ball, the first spin rate is determined using the images.

* * * * *